United States Patent [19]

McConnell et al.

[11] Patent Number: 4,727,107

[45] Date of Patent: Feb. 23, 1988

[54] FLAME RETARDANT ADHESIVE COMPOSITIONS

[75] Inventors: Richard L. McConnell; Donald C. Davis; Frederick D. Petke; Max F. Meyer, Jr., all of Kingsport, Tenn.

[73] Assignee: Eastman Kodak Company, Rochester, N.Y.

[21] Appl. No.: 727,984

[22] Filed: Apr. 29, 1985

[51] Int. Cl.$^4$ .............................. C08K 5/06; C09J 3/16
[52] U.S. Cl. ..................................... 524/371; 524/410; 524/411; 524/412; 524/472; 428/346; 428/349
[58] Field of Search ............... 524/410, 411, 412, 371, 524/472; 428/200, 921, 317.7, 349, 346

[56] References Cited

U.S. PATENT DOCUMENTS

| | | | |
|---|---|---|---|
| 3,941,904 | 3/1976 | Hoh et al. | 428/346 |
| 3,997,505 | 12/1976 | Albright | 524/120 |
| 4,169,082 | 9/1979 | Kusterer | 524/176 |
| 4,173,506 | 11/1979 | Pletcher | 428/349 |

OTHER PUBLICATIONS

E. L. Lawton et al., Flame-Retardant Polymeric Materials, pp. 196–201, 428–429, Menachem Lewin et al., Editors, (1975).

*Primary Examiner*—Veronica P. Hoke
*Attorney, Agent, or Firm*—John F. Stevens; William P. Heath, Jr.

[57] ABSTRACT

Disclosed are hot-melt adhesive compositions comprising discrete particles of polyester adhesives, discrete particles of polyester containing a halogenated organic compound and discrete particles containing an antimony compound. Also disclosed is a method of incorporating both a halogenated organic compound and an antimony compound into a polyester adhesive composition.

11 Claims, No Drawings

FLAME RETARDANT ADHESIVE COMPOSITIONS

DESCRIPTION

Technical Field

This invention relates to hot-melt adhesive compositions comprising discrete particles of polyester adhesives, discrete particles of polyester containing a halogenated organic compound and discrete particles containing an antimony compound. The invention also relates to a method of incorporating both a halogenated organic compound and an antimony compound into a polyester adhesive composition.

BACKGROUND OF THE INVENTION

Modern automotive upholstery fabrics typically consist of layers of fabric and foam cushioning. The fabric has been sewn to the foam in the past, but newer technology uses hot-melt adhesives to join the fabric to the foam. Fabric/foam laminates made in this way must pass certain flammability tests. Many otherwise satisfactory upholstery laminates burn erratically in flammability tests. Similar problems have been noted in automotive carpeting and headliner laminates. It is desirable to reduce the flammability of these materials and one way to reduce flammability is to introduce a flame retardant into the adhesive used to unite the fabric and the foam.

Adhesives which are generally useful for fabric lamination include low-melting polyesters, as well as other low-melting polymers, such as polyamides and polyurethanes. The adhesives are usually applied in powder form, although webs of adhesives may also be used advantageously. The upholstery laminates are finished by heatsealing the fabric to the foam by fusing the adhesive.

Flame retardant additives which are useful in certain fabric and plastic applications include brominated and chlorinated organic compounds. The efficiency of these compounds is enhanced by the addition of antimony compounds to the product. However, if the brominated or chlorinated compounds and antimony compounds are heated together to about 200° C. or above, they can react to form volatile, toxic antimony compounds such as antimony oxybromide or oxychloride. This behavior has generally precluded the use of such agents in hot-melt adhesive compositions which are held in the molten state for substantial periods of time. Also, direct blending of the halogenated compounds or antimony compounds into the powdered adhesive results in possible exposure to fine dust of the antimony or halogenated compounds, and this exposure is undesirable.

DISCLOSURE OF THE INVENTION

According to the present invention, chlorinated or brominated organic flame retardant compounds are combined with adhesives along with antimony compounds in a manner which is safe and nontoxic. The process for combining the components consists of making batch concentrates of each of the additives separately in a suitable polymer and keeping the concentrates separate throughout processing. For example, the halogenated compound may be mixed with a polyester in an extruder and the product may be formed into particles of about the same size as the adhesive product to be modified. Similarly, the antimony compound may be incorporated separately into a polymer in an extruder and formed into particles of the same size as the adhesive product. Subsequently, the two concentrates of flame retardant compositions are mixed with the adhesive at low temperature, typically room temperature, such that the antimony and halogen compounds do not react. This method has the additional benefit that the finely divided antimony compound and halogenated compound are encapsulated in polymer, thus reducing dust problems during the use of the flame-retardant adhesive. In addition, the compounds have not been heated together and thus retain their full potential as flame retardants in the final product. When the hot melt adhesive is fused during the lamination, the temperature reached is below the point at which significant reaction occurs and the time at that temperature is exceedingly short, so no appreciable reaction occurs.

The present invention provides a polyester adhesive composition in particulate form comprising a generally uniform mixture of discrete particles of (a) a thermoplastic polyester adhesive having a melting temperature of about 80°–180° C. and a heat of fusion of less than 10 calories/gram, (b) a polyester compatible with (a) having dispersed therein a chlorinated or brominated flame retardant compound, and (c) a polyester compatible with (a) and (b) having dispersed therein an antimony flame retardant compound having the ability to enhance the flame retarding characteristics of the chlorinated or brominated compound, the chlorinated or brominated compound of (b) and the antimony compound of (c) being present in the polyester adhesive composition in amounts of about 1–25% each based on the total composition weight.

Also, the present invention provides a method of preparing a polyester adhesive composition having reduced flammability characteristics comprising the steps of (a) preparing a first concentrate in particulate form of a polyester having dispersed therein a chlorinated or brominated flame retardant compound, (b) preparing a second concentrate in particulate form of a polyester having dispersed therein an antimony compound having the ability to enhance the flame retarding characteristics of said chlorinated or brominated compound, (c) mixing said first and second concentrates with a particulate thermoplastic polyester adhesive having a melting temperature of about 80°–180° C. and a heat of fusion of less than 10 calories per gram, the particles being of a size compatible with the particles of said first and second concentrates, the proportions of said first and second concentrates being such that the adhesive composition has a concentration of chlorinated or brominated compound, and antimony compound of about 1–25% each, based on the total weight of the adhesive composition.

Preferably, the polyesters described in (a), (b), and (c) are the same, or nearly the same. However, they can be different so long as they are compatible. An especially preferred polyester is one containing repeat units from terephthalic acid and 1,4-butanediol or 1,6-hexanediol. Other preferred polyesters include a polyester containing repeat units from terephthalic acid, isophthalic acid, 1,6-hexanediol and 1,4-butanediol, a polyester containing repeat units from terephthalic acid, isophthalic acid and 1,4-butanediol, a polyester containing repeat units from terephthalic acid, glutaric acid, 1,4-butanediol and diethylene glycol, a polyester containing repeat units from terephthalic acid, glutaric acid, 1,6-hexanediol, and diethylene glycol, a polyester containing repeat units of terephthalic acid, isophthalic acid, 1,6-hexanediol and ethylene glycol, a polyester containing repeat units of hexahydroterephthalic acid, glutaric acid, 1,4-butanediol, and diethylene glycol, a polyester containing repeat units from terephthalic acid, ethylene glycol, and 1,4-cyclohexanedimethanol, and the like which may be produced by conventional techniques known in the art.

An especially preferred halogenated compound is decabromodiphenyl ether. Other useful halogenated compounds include hexabromocyclododecane, decachlorodiphenyl ether, bis(tribromophenoxy)ethane, bis(tribromophenyl) ether, octabromodiphenyl oxide, poly(dibromophenylene oxide) and the like.

An especially preferred antimony compound is antimony trioxide. Other useful antimony compounds include antimony pentoxide and antimony triacetate.

The halogenated compounds and antimony compounds used in this invention are effective at concentrations in the final product ranging from about 1 wt % each to about 25 wt % each, preferably about 2% to about 15% each. Generally higher concentrations provide little additional benefit beyond about 15 wt % of the brominated compound. The antimony compounds may also be used at slightly lower concentrations than the brominated or chlorinated compounds. Total halogenated compound and antimony compound levels should not exceed about 30 wt % of the final product. Also, it is preferred that the halogenated compound be present in an amount at least as great as the antimony compound.

Preparation of the concentrates may take place by any conventional means. A preferred method is to mix the additive compounds in molten polyester, followed by extrusion and pelletization to produce two separate concentrates. The additives may be present in these concentrates in amounts ranging from about 10 to about 60% by weight. The pellets may be further ground if desired. Pellets, or the ground powder, of the three components of the adhesive composition are then blended together by conventional techniques of mixing solid particles. The polyester adhesive compositions may be used by applying powders thereof to one of the materials to be laminated, followed by the application of heat to form a bond. The powders may be applied by random sprinkling such as from a Schilling roll, powder point or paste application methods, or by electrostatic spray guns.

The following examples are submitted for a better understanding of the invention.

EXAMPLE 1

A concentrate of decabromodiphenyl ether (35 wt %) and a polyester [consisting of 100 mole % terephthalic acid units, 69 mole % of ethylene glycol units, and 31 mole % of 1,4-cyclohexanedimethanol units, prepared by typical melt polyesterification reactions, having an I.V. of 0.60 dL/g, a Tg of 80° C., and no crystallinity (Polyester I)](65 wt. %) is prepared by mixing the components and blending them in a melt phase in an extruder at 200° C., (Concentrate A). The resulting compound is pelletized and is powdered in a hammermill. Similarly, a concentrate of the above polyester (65 wt %) and antimony trioxide (35 wt %) is prepared in an extruder at the same conditions and is ground to a powder in the same manner (Concentrate B). A polyester adhesive is prepared by typical polycondensation techniques to have 100 mole % terephthalic acid units, 80 mole % 1,6-hexanediol units, and 20 mole % 1,4-butanediol units; the polyester has a Tm of 130° C., a heat of fusion of 9 cal/g, a Tg of 20° C., and an I.V. of 0.72 dL/g (polyester II). This polyester is ground in the presence of liquid nitrogen in a hammermill to a powder and is sieved to separate the fraction which passes through a 40 U.S. mesh screen. The two concentrates are also sieved to pass through a 40-mesh screen. The powders are mixed together at the ratios of 80 wt % Polyester II, 10 wt % concentrate A and 10 wt % concentrate B to give a final product which contains 93 wt % polyester, 3.5 wt % decabromodiphenyl ether, and 3.5 wt % antimony trioxide. The flame-retardant adhesive is applied by sprinkling to the foam of a seating laminate and is fused in an infrared-heated oven; the seating face fabric is laminated to the adhesive-coated foam by heatsealing under pressure in a continuous operation. The laminate is tested according to the DOT (Department of Transportation) Standard 302. Burning rates of the samples tested are 0.91, 0.96, and 0.95 in./min for three specimens. Similar bonds made with the same adhesive without the flame retardant concentrate generally have burn rates in the range of 3.9 to 4.4 in./min.

Similarly good results are achieved when the decabromodiphenyl ether concentrate is made in Polyester II.

EXAMPLE 2

Concentrates of 35 wt % decabromodiphenyl ether in Polyester II and 35 wt % antimony trioxide in Polyester II are prepared separately by melt blending at 200° C. in an extruder with a mixing screw. The resulting blends are micropulverized separately and are sieved through a 40-mesh screen. The powdered concentrates are mixed with powdered Polyester II adhesive in a ratio of 10 wt % each concentrate and 80 wt % adhesive by tumbling. The powders are applied to polyurethane foam by the method of Example 1 and the powders are fused in an infrared-heated oven and are laminated to a brushed nylon velour face fabric in one operation. The resulting laminate is tested for burning rate by the method of Example 1. The laminate burns with rates of 1.1, 1.2, and 0.9 in./min. Similar good results are obtained when the flame retardant concentrates are mixed with low-melting, powdered polyamide or polyurethane adhesives.

EXAMPLE 3

A concentrate of hexabromocyclododecane (35 wt %) in Polyester I (65 wt %) is prepared in a Banbury mixer at 200° C.; a similar concentrate of antimony acetate is prepared in the same manner. The two concentrates are micropulverized separately and sieved through a 40-mesh screen. The concentrate containing the brominated compound (20 wt %) and the antimony compound concentrate (10 wt %) are mixed at room temperature by tumbling with 70 wt % of Polyester II powder to form a flame-retardant adhesive. The resulting adhesive powder is applied by electrostatic spray to polyether foam and the powdered adhesive is fused in an electrically heated oven and laminated to a polyester velour face fabric in one operation. The resulting fabric is tested for burn rate by the method in Example 1. The laminates burn at the rate of 0.95, 0.80, and 1.2 in./min for three specimens.

EXAMPLE 4

A concentrate of chlorinated paraffin wax (35 wt %) in Polyester I (65 wt %) is prepared in an extruder at 200° C. A concentrate of antimony oxide (35 wt %) is prepared in an extruder at 200° C. in a base of Polyester II. The concentrates are ground in a micropulverizer as described in Example 1 and are sieved through a 40-mesh screen. A polyester adhesive is prepared by typical melt-phase polycondensation to consist of 70 mole % of terephthalic acid units, 30 mole % of glutaric acid units, 55 mole % of 1,4-butanediol units, and 45 mole % of diethylene glycol units; it has an I.V. of 0.85 dL/g, a $T_m$ of 108° C., a heat of fusion of 3.5 cal/g, and a $T_g$ of 1° C. This adhesive (Polyester III) is micropulverized and the resulting powder is sieved through a 40-mesh screen. The adhesive is mixed (70 wt %) with the chlorinated paraffin wax concentrate (20 wt %) and the antimony oxide concentrate (10 wt %) at room temperature. The resulting powder is applied to polyurethane foam by air spray and is fused to the foam with infrared heat and laminated to a polyester face fabric in one operation. The laminates are tested according to the test of Example 1 and are found to have burning rates of 1.1, 1.3, and 0.9 in./min for three samples.

Similarly good results are achieved when the antimony oxide concentrate is made in Polyester III.

Whenever the term "inherent viscosity" (I.V.) is used in this application, it will be understood to refer to viscosity determinations made at 25° C. using 0.5 gram of polymer per 100 ml. of a solvent composed of 60 wt. % phenol and 40 wt. % tetrachloroethane.

The "melting point" ($T_m$) and "glass transition temperature" ($T_g$) of the polymers described in this application are readily obtained with a Differential Scanning Calorimeter.

The "heat of fusion" ($\Delta H_f$) of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society for Testing and Materials, and more specifically identified as Test Number D-1876-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A polyester adhesive composition in particulate form comprising a generally uniform mixture of discrete particles of
    (a) a thermoplastic polyester adhesive having a melting temperature of about 80°–180° C. and a heat of fusion of less than 10 calories/gram,
    (b) a polyester compatible with (a) having dispersed therein a chlorinated or brominated flame retardant compound, and
    (c) a polyester compatible with (a) and (b) having dispersed therein an antimony flame retardant compound having the ability to enhance the flame retarding characteristics of said chlorinated or brominated compound, the chlorinated or brominated compound of (b) and the antimony compound of (c) being present in said polyester adhesive composition in amounts of about 1–25% each based on the total composition weight.

2. A polyester adhesive composition according to claim 1 wherein the polyester adhesive described in (a) is essentially the same as the polyester of (b) and (c).

3. A polyester adhesive composition according to claim 2 wherein said polyester is a copolyester comprising repeating units from terephthalic acid and 1,4-butanediol or 1,6-hexanediol.

4. A polyester adhesive composition according to claim 1 wherein the polyester of (b) contains decabromodiphenyl ether.

5. A polyester adhesive composition according to claim 1 wherein said antimony compound is antimony trioxide.

6. The method of preparing a polyester adhesive composition having reduced flammability characteristics comprising the steps of
    (a) preparing a first concentrate in particulate form of a polyester having a chlorinated or brominated flame retardant compound dispersed therein,
    (b) preparing a second concentrate in particulate form of a polyester having dispersed therein an antimony compound having the ability to enhance the flame retarding characteristics of said chlorinated or brominated compound,
    (c) mixing said first and second concentrates with a particulate thermoplastic polyester adhesive having a melting temperature of about 80°–180° C. and a heat of fusion of less than 10 calories per gram, the particles being of a size compatible with the particles of said first and second concentrates, and the proportions of said first and second concentrates being such that the adhesive composition has a concentration of chlorinated or brominated compound, and antimony compositions of about 1–25% each, based on the total weight of the adhesive composition, and not exceeding a total of about 30 wt % of halogenated compound and antimony compound.

7. The method of claim 6 wherein the polyester in the concentrate of (a) and (b) is essentially the same as the polyester adhesive of (c).

8. The method of claim 6 wherein said polyester adhesive is a copolyester comprising repeating units from terephthalic acid and 1,4-butanediol, 1,6-hexanediol, or mixtures thereof.

9. The method of claim 6 wherein said polyester adhesive is a copolyester comprising repeating units from terephthalic acid, glutaric acid, 1,4-butanediol and diethylene glycol.

10. The method of claim 6 wherein said chlorinated or brominated compound is decabromodiphenyl ether.

11. The method of claim 6 wherein said antimony compound is antimony trioxide.

* * * * *